United States Patent
Uchiyama et al.

(10) Patent No.: US 9,753,308 B2
(45) Date of Patent: Sep. 5, 2017

(54) METHOD FOR DESIGNING SPECTACLE LENS, AND SYSTEM FOR DESIGNING SPECTACLE LENS

(71) Applicant: NIKON CORPORATION, Tokyo (JP)

(72) Inventors: Yukimasa Uchiyama, Narashino (JP); Masatomo Mizuno, Ichikawa (JP)

(73) Assignee: NIKON CORPORATION, Tokyo (JP)

(*) Notice: Subject to any disclaimer, the term of this patent is extended or adjusted under 35 U.S.C. 154(b) by 49 days.

(21) Appl. No.: 14/703,180

(22) Filed: May 4, 2015

(65) Prior Publication Data
US 2015/0309333 A1   Oct. 29, 2015

Related U.S. Application Data

(63) Continuation of application No. PCT/JP2013/079876, filed on Nov. 5, 2013.

(30) Foreign Application Priority Data

Nov. 5, 2012 (JP) ................... 2012-243733

(51) Int. Cl.
  *G02C 7/02* (2006.01)
  *G02C 7/06* (2006.01)
(52) U.S. Cl.
  CPC ............ *G02C 7/028* (2013.01); *G02C 7/027* (2013.01); *G02C 7/061* (2013.01)
(58) Field of Classification Search
  CPC ........ G02C 7/027; G02C 7/028; G02C 7/024; G02C 7/06; G02C 7/061; G02C 7/063
  (Continued)

(56) References Cited

U.S. PATENT DOCUMENTS

2002/0176052 A1   11/2002 Ueno
2004/0075809 A1*  4/2004 Wildsmith ......... G05B 19/4097
                                                         351/159.74
(Continued)

FOREIGN PATENT DOCUMENTS

JP    2003-075784    3/2003
JP    4361254        11/2009
(Continued)

OTHER PUBLICATIONS

Office Action issued by Japanese Patent Office in counterpart Japanese Patent Application No. JP2014-544623 dated Apr. 26, 2016, and English Translation thereof.
(Continued)

*Primary Examiner* — Jordan Schwartz
(74) *Attorney, Agent, or Firm* — Finnegan, Henderson, Farabow, Garrett & Dunner LLP

(57) ABSTRACT

A method for designing a spectacle lens includes: a determination step of determining at least one optimization condition to be used in optimization design of a spectacle lens in accordance with a prescription condition for the spectacle lens; a design step of designing at least one prototype lens by the optimization design corresponding to the at least one optimization condition determined in the determination step; a selection step of selecting a prototype lens to be provided as the spectacle lens from the at least one prototype lens designed in the design step; and a recording step of performing update recording, at a database in which a plurality of optimization conditions respectively correlated with a plurality of prescription conditions are recorded, an optimization condition that is correlated with the prescription condition for the spectacle lens to an optimization condition used in the optimization design of the prototype lens selected in the selection step.

10 Claims, 10 Drawing Sheets

(58) Field of Classification Search
USPC ............. 351/159.74, 159.75, 159.76, 159.77
See application file for complete search history.

(56) References Cited

U.S. PATENT DOCUMENTS

| | | |
|---|---|---|
| 2006/0055877 A1 | 3/2006 | Yanari |
| 2009/0326693 A1 | 12/2009 | Yanari |
| 2010/0293192 A1 | 11/2010 | Suy et al. |
| 2015/0049304 A1* | 2/2015 | Cussac .................. G02C 7/028 351/159.75 |
| 2015/0055085 A1* | 2/2015 | Fonte ................. G06Q 30/0621 351/178 |

FOREIGN PATENT DOCUMENTS

| | | |
|---|---|---|
| JP | 2011-508275 | 3/2011 |
| WO | WO 2008/010504 | 1/2008 |

OTHER PUBLICATIONS

International Search Report issued by the Japanese Patent Office in International Application No. PCT/JP2013/079876, mailed Dec. 10, 2013 (2 pages).

Internation Preliminary Report on Patentability and Written Opinion of the International Searching Authority issued by the International Bureau of WIPO in International Application No. PCT/JP2013/079876, mailed Dec. 10, 2013 (14 pages).

* cited by examiner

FIG. 4

| PRESCRIPTION POWER | ASTIGMATIC POWER | AXIS OF ASTIGMATISM | ADDITION | BASE CURVE | CENTER THICKNESS |
|---|---|---|---|---|---|
| -2.00 | -1.00 | 90 | 2.00 | 2.00 | 1.10 |

DAMPING FACTOR
1.00

| EVALUATION x COORDINATE | EVALUATION y COORDINATE | TARGET VALUE | WEIGHT |
|---|---|---|---|
| 0.00 | 0.00 | 0.09 | 100 |
| 1.00 | 0.00 | 0.24 | 100 |
| 2.00 | 0.00 | 0.37 | 100 |
| ... | ... | ... | ... |

| PRESCRIPTION POWER | ASTIGMATIC POWER | AXIS OF ASTIGMATISM | ADDITION | BASE CURVE | CENTER THICKNESS |
|---|---|---|---|---|---|
| -2.25 | -1.00 | 90.00 | 2.00 | 2.00 | 1.10 |

DAMPING FACTOR
1.00

| EVALUATION x COORDINATE | EVALUATION y COORDINATE | TARGET VALUE | WEIGHT |
|---|---|---|---|
| 0.00 | 0.00 | 0.09 | 100 |
| 1.00 | 0.00 | 0.24 | 100 |
| 2.00 | 0.00 | 0.37 | 100 |
| ... | ... | ... | ... |

{ PRESCRIPTION CONDITION / OPTIMIZATION CONDITION }
{ PRESCRIPTION CONDITION / OPTIMIZATION CONDITION }

EXAMPLE OF OPTICAL PERFORMANCE OF PROTOTYPE LENS
(EVALUATION VALUE 0.048)

EXAMPLE OF OPTICAL PERFORMANCE OF PROTOTYPE LENS
(EVALUATION VALUE 0.024)

FIG.9

| OPTIMIZATION CONDITION (1) | | | | OPTIMIZATION CONDITION |
|---|---|---|---|---|
| DAMPING FACTOR | | | | |
| 1.00 | | | | |
| EVALUATION x COORDINATE | EVALUATION y COORDINATE | TARGET VALUE | WEIGHT | |
| 0.00 | 0.00 | 0.09 | 100 | |
| 1.00 | 0.00 | 0.24 | 100 | |
| 2.00 | 0.00 | 0.37 | 100 | |
| ... | ... | ... | ... | |

| OPTIMIZATION CONDITION (2) | | | | OPTIMIZATION CONDITION |
|---|---|---|---|---|
| DAMPING FACTOR | | | | |
| 1.00 | | | | |
| EVALUATION x COORDINATE | EVALUATION y COORDINATE | TARGET VALUE | WEIGHT | |
| 0.00 | 0.00 | 0.09 | 110 | |
| 1.00 | 0.00 | 0.24 | 110 | |
| 2.00 | 0.00 | 0.37 | 110 | |
| ... | ... | ... | ... | |

METHOD FOR DESIGNING SPECTACLE LENS, AND SYSTEM FOR DESIGNING SPECTACLE LENS

This application is a continuation of International Application No. PCT/JP2013/079876 filed Nov. 5, 2013.

INCORPORATION BY REFERENCE

The disclosures of the following priority applications are herein incorporated by reference:

Japanese Patent Application No. 2012-243733 filed Nov. 5, 2012

International Application No. PCT/JP2013/079876 filed Nov. 5, 2013

BACKGROUND OF THE INVENTION

1. Field of the Invention

The present invention relates to a method for designing a spectacle lens and to a system for designing a spectacle lens.

2. Description of Related Art

Japanese Patent No. 4361254 discloses a method for designing a spectacle lens with two lens surfaces that constitute the spectacle lens, one of the lens surfaces having a spherical or non-spherical surface shape formed in advance and the other of the lens surfaces being a non-spherical surface shape optimization-designed according to respective prescription conditions for wearers of the spectacle lens. Recent development of processing technology enables a complicated non-spherical surface shape to be processed in a relatively short time.

SUMMARY OF THE INVENTION

In optimization design of a spectacle lens, target optical performance is set and a simulation method using a computer (for instance, damped least squares (DLS) method, or genetic algorithm) is used to design the shape of a lens surface such that the optical performance of the spectacle lens is approximated to the target optical performance. Consequently, the optical performance of the spectacle lens depends on the optimization condition used in the optimization design (that is, design condition). The optimization condition may include, for instance, a target optical performance value, coordinate values on a lens surface at which the optical performance is evaluated, a weight value, a simulation calculation coefficient, and a damping factor for any DLS method used in the optimization design.

In particular, progressive power lenses, for instance, have very complicated shapes and have base curve values, which have great influences on aberration, ranging over a wide range, and thus, it would be difficult to uniformly determine the optimization conditions. Accordingly, it is desirable that for each prescription condition, optimization design be performed using many optimization conditions and the optical performance of the obtained designs be compared with each other to determine the best optimization condition.

A method for designing a spectacle lens according to a first aspect of the present invention comprises: a determination step of determining at least one optimization condition to be used in optimization design of a spectacle lens in accordance with a prescription condition for the spectacle lens; a design step of designing at least one prototype lens by the optimization design corresponding to the at least one optimization condition determined in the determination step; a selection step of selecting a prototype lens to be provided as the spectacle lens from the at least one prototype lens designed in the design step; and a recording step of performing update recording, at a database in which a plurality of optimization conditions respectively correlated with a plurality of prescription conditions are recorded, an optimization condition that is correlated with the prescription condition for the spectacle lens to an optimization condition used in the optimization design of the prototype lens selected in the selection step.

According to a second aspect of the present invention, in the method for designing a spectacle lens according to the first aspect, it is preferred that in the determination step, an optimization condition correlated with the prescription condition for the spectacle lens is acquired from the database and is determined as one of optimization conditions to be used in the design step.

According to a third aspect of the present invention, in the method for designing a spectacle lens according to the first or second aspect, it is preferred that in the selection step, at least one of optical performance and a shape of the prototype lens is evaluated and based on an evaluation result a prototype lens to be provided as the spectacle lens is selected from the prototype lens.

According to a fourth aspect of the present invention, in the method for designing a spectacle lens according to the third aspect, it is preferred that the optical performance is at least one of astigmatism, average spherical power, and distortion.

According to a fifth aspect of the present invention, in the method for designing a spectacle lens according to any one of the first to fourth aspects, it is preferred that in the recording step, the optimization condition used in the optimization design of the prototype lens selected in the selection step is additionally recorded at the database correlated with the prescription condition for the spectacle lens if no optimization condition corresponding to the prescription condition for the spectacle lens is recorded at the database.

According to a sixth aspect of the present invention, in the method for designing a spectacle lens according to the third or fourth aspect, it is preferred that in the recording step, optimization conditions determined in the determination step and respective evaluation results for the optimization conditions in the selection step, correlated with the prescription condition for the spectacle lens, are recorded as history information about the optimization conditions and the evaluation results at the database.

According to a seventh aspect of the present invention, in the method for designing a spectacle lens according to the sixth aspect, it is preferred to further comprise: a display step of displaying at a display device the history information recorded correlated with the prescription condition for the spectacle lens at the database.

According to an eighth aspect of the present invention, in the method for designing a spectacle lens according to any one of the first to seventh aspects, it is preferred that in the determination step, the optimization condition to be used in the design step is determined according to a list of optimization conditions stored in advance in a storage device.

According to a ninth aspect of the present invention, in the method for designing a spectacle lens according to the sixth aspect, it is preferred that in the determination step, the optimization condition to be used in the design step is determined based on the history information recorded correlated with the prescription condition for the spectacle lens.

A system for designing a spectacle lens according to a tenth aspect of the present invention comprises: a determination unit that determines at least one optimization condition to be used in optimization design of a spectacle lens in accordance with a prescription condition for the spectacle lens; a design unit that designs by the optimization design at least one prototype lens corresponding to the at least one optimization condition determined by the determination unit; a selection unit that selects a prototype lens to be provided as the spectacle lens from the at least one prototype lens designed by the design unit; and a record control unit that performs update recording, at a database in which a plurality of optimization conditions respectively correlated with a plurality of prescription conditions are recorded, an optimization condition that is correlated with the prescription condition for the spectacle lens to an optimization condition used in the optimization design of the prototype lens selected by the selection unit.

BRIEF DESCRIPTION OF THE DRAWINGS

FIG. 4 is a diagram illustrating an example of the configuration of data recorded in a first embodiment of an optimization condition database;

FIG. 9 is a diagram showing an example of a prototype optimization condition list according to a third embodiment.

DESCRIPTION OF EMBODIMENTS

Figure 1:
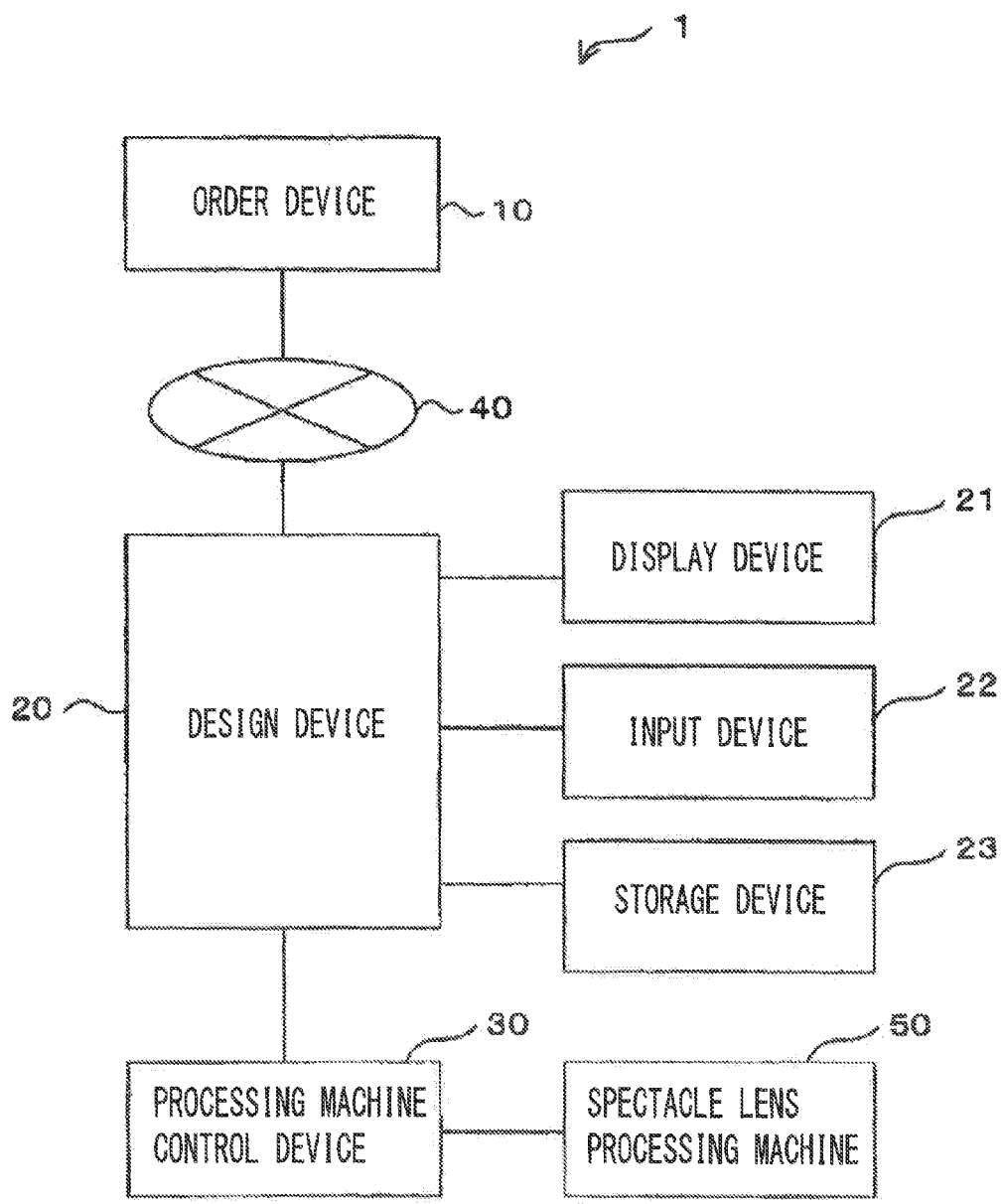
FIG. 1 is a diagram illustrating the configuration of a system for designing a spectacle lens according to an embodiment of the present invention.

Prior to detailed explanation of embodiments of the present invention, underlying technology used in the embodiments of the present invention is explained. In spectacle lens industries, semi-finished lenses are used. A semi-finished lens has two surfaces that constitute the lens, and one of the lens surface (hereafter referred to as a "processed surface") is processed in advance. Another lens surface (hereafter, referred to as a "prescription surface"), which is unprocessed in advance, remains to be processed according to a designated prescription condition. The prescription condition is a condition that determines the specification for a spectacle lens. As used herein, the term specification for a spectacle lens includes, for instance, one of: prescription power, astigmatic power, axis of astigmatism, addition, base curve (curvature at the processing surface), and center thickness. The shape of the processed surface is a spherical surface shape, a non-spherical surface shape, or a progressive surface shape. The shape of the prescription surface is a non-spherical shape or a free-form surface shape. The shape of the prescription surface is designed by optimization design for optimizing the optical performance according to the designated prescription condition. The shape of the prescription surface designed by optimization design can be expressed in various ways. For instance, it can be expressed by using a formula having a polynominal non-spherical coefficient or coefficients in the form of a function, or spline surface shapes such as bicubic spline or B-spline.

The optical performance of a spectacle lens is evaluated using, for instance, ray-trace simulation. To evaluate optical performance, for instance, astigmatism or average spherical power is used. In this explanation, the astigmatism and average spherical power, respectively, are expressed by equations (1) and (2) below assuming that for light that is transmitted at any point on a lens surface, maximum spherical power is Dmax and minimum spherical power is Dmin.

$$\text{Astigmatism} = (D\text{max} - D\text{min}) \quad (1)$$

$$\text{Average spherical power} = (D\text{max} + D\text{min})/2 \quad (2)$$

To evaluate the optical performance of a spectacle lens, evaluation relating to aberration and evaluation as to whether designated prescription condition is satisfied are performed.

The evaluation of the optical performance relating to aberration is performed using numerical values of astigmatism and of average spherical power on the lens surface. Although it is possible to perform absolute evaluation of the optical performance relating to aberration, it is also possible to perform relative evaluation, which is performed as follows. That is, distributions of astigmatism and average spherical power are set as reference optical performance for each product and evaluations are performed using a difference or mean square deviation between the optical performance of a spectacle lens that is an object of evaluation and the reference optical performance.

To evaluate whether the optical performance satisfies the designated prescription condition, it is determined whether the value of average spherical power at a specified position is within a set range of allowable error. In particular, for a progressive power lens, the average spherical power at a reference point, which is set to specify prescription power and addition, is an important value of this evaluation.

The shape of the prescription surface of a spectacle lens is determined so that the optical performance of the spectacle lens satisfies the designated prescription condition and does not deviate from the reference optical performance set for each product. Specifically, the shape of the prescription surface of a spectacle lens is determined so that the average spherical power at the specified position falls within the set range of allowable error and the difference or mean square deviation between the optical performance of the lens and the reference optical performance is as small as possible. The prescription of a spectacle lens covers over a wide range and the optical performance of the spectacle lens may fluctuate depending on the prescription condition. It is also important in determining the shape of the prescription surface to reduce or eliminate the fluctuation of the optical performance that could occur depending on the prescription condition.

To determine the shape of the prescription surface, a manual method may be used. However, it is more efficient to use an appropriate optimization design method by a simulation method using a computer (for instance, damped least squares (DLS) method or genetic algorithm) or the like. In the simulation method using a computer, target optical performance is set and calculation processing is performed to approximate the optical performance of a spectacle lens to the target optical performance and the shape of the prescription surface of the spectacle lens is modified based on the result of the calculation processing. Basically, the target optical performance may be the same as the reference optical performance. However, for instance, a combination of average spherical power and astigmatism as the optical performance to be evaluated, it is difficult to make both the factors correspond to the target optical performance and in many cases these are in a trade-off relation. Consequently, to achieve a balance of average spherical power with astigmatism, it may be effective to perform optimization design of a spectacle lens by daringly setting the target optical performance to a value different from the reference optical performance.

The optical performance of a spectacle lens may change depending on the optimization condition (i.e., design conditions) used in the optimization design. The optimization conditions include, for instance, target optical performance values, coordinate values on the lens surface for which the optical performance is evaluated, weight values, simulation calculation coefficients, and, if the DLS method is used, damping factors. Consequently, in addition to appropriately designing a basic design of the spectacle lens, appropriately setting optimization conditions for optimization design is an important factor that may influence the optical performance of the spectacle lens.

The optimization conditions are determined, typically, within a development period of a spectacle lens product. After the spectacle lens is put into commercial reality and acceptance of an order is started, optimization design using the optimization conditions determined within the development period is daily achieved for individual prescriptions.

In particular, a progressive power lens has a considerably complicated shape and a value of base curve that gives a large influence on aberration differing from lens to lens, and it is uneasy to uniformly determine the optimization conditions. Consequently, it is desirable that the optimization design be performed by using many optimization conditions for each of individual prescription conditions and comparing the obtained designs for optical performance so as to determine the best optimization condition.

However, there are many kinds of prescription condition and also there are many kinds of optimization condition and thus it will take a considerably long time to determine favorable optimization conditions by performing optimization design for each of individual prescription conditions under many optimization conditions. Consequently, it is difficult to achieve such favorable optimization conditions within a limited development period.

As a countermeasure, a method may be conceived in which the prescription conditions are classified into groups each including members having optical characteristics close to each other and for each of such individual group, an optimization condition common to the members of the individual group is determined. As another countermeasure, a method may be conceived in which typical prescription conditions are sorted out and only optimization conditions that correspond to the sorted out prescription conditions are determined in advance. Then to optimize any specified prescription condition other than the sorted out ones, some prescription conditions close to the specified prescription conditions are selected and an optimization condition that is an average or medium of optimization conditions that correspond to the selected prescription conditions is generated.

In both the cases, a single common optimization condition is used for a plurality of prescription conditions and thus it cannot be said that always a suitable optimization condition can be adopted. Whether an optimization condition suitable for individual prescription conditions can be adopted depends on how to set groups or how to sort typical prescription conditions.

As mentioned above, for determination of optimization conditions within a limited development period, it is still difficult to determine optimization conditions suitable for individual prescription conditions although currently improvement of the processing technology allows creation of lens surface shapes individually.

The embodiments of the present invention explained hereafter are in contrast to the conventional technique in which an optimization condition is determined within the development period and then the determined optimization condition is used fixedly or unchanged. In the embodiments, for instance, upon acceptance of each order for a product of a spectacle lens, optimization design of the product is performed under a plurality of optimization conditions based on the prescription conditions according to the order, the optical performance of the obtained design for each optimization condition is compared with each other, and the optimization condition is updated based on the result of the comparison. This configuration enables improvement of optimization conditions after the commercialization of the spectacle lens and acceptance of order is started to approximate the optimization condition to the optimization condition suitable for the individual prescription condition progressively, e.g., day by day. Hereafter, the embodiments of the present invention are concretely explained focusing on this feature.

First Embodiment

Now, referring to the drawings, the method for designing a spectacle lens and the system for designing a spectacle lens according to a first embodiment of the present invention are explained. The unit of refractive power is expressed in diopter (D) unless otherwise indicated specifically. In the following explanation, a region for distance vision in a progressive power lens is referred to as a "distance zone" and a region for near vision in the progressive power lens is referred to as a "near zone". A region connecting the distance zone and the near zone is referred to as an "intermediate zone". In the following explanation, "upper", "lower", "horizontal", "vertical" and the like used in relation to a spectacle lens, which is processed for eyeglasses, are expressed based on the positional relationships of the lens in a state in which the eyeglasses are worn. For instance, a lower distance zone indicates a region that is within the distance zone and is closer to the intermediate zone. In the following drawings explained below, the positional relationship (upper, lower, right, or left) corresponds to the positional relationship (upper, lower, right, or left) of the spectacle lens on the paper depicting the spectacle lens.

FIG. 1 is a diagram illustrating the configuration of a system for designing a spectacle lens (or design system) 1 according to an embodiment of the present invention. The design system 1 includes an order device 10, which is a computer that executes order processing for placing an order for a spectacle lens, a design device 20, which is a computer that executes design processing for a spectacle lens, and a processing machine control device 30, which is a computer that controls a processing machine that processes a spectacle lens. The order device 10 is installed at, for instance, an eyeglasses shop. The design device 20 and the processing machine control device 30 are installed at, for instance, a factory at which eyeglasses are manufactured. The order device 10 and the design device 20 are connected via a communication line 40, for instance, the Internet. To the design device 20 are connected a display device 21, for instance, a liquid crystal display, an input device 22, for instance, a keyboard or a mouse, and a storage device 23, for instance, a hard disk drive. The design device 20 is connected to a spectacle lens processing machine 50 via the processing machine control device 30.

In this embodiment, explanation is made on an example in which a DLS method is selected as the simulation method for the optimization design. In the optimization design using the DLS method, the optimization design may be performed so that a merit function becomes minimal. The merit function is obtained by calculating differences between optical performance values and respective target optical performance values at a plurality of coordinates set on the lens surface, multiplying the obtained differences by individual weight values, and calculating the sum of squares of these weighted differences. In this case, the optimization conditions may include coordinates of an evaluation point (evaluation coordinates) on the lens surface at which the optical performance of the spectacle lens is evaluated, a target optical performance value, a weight value, and a damping factor used in the DLS method.

Figure 2:
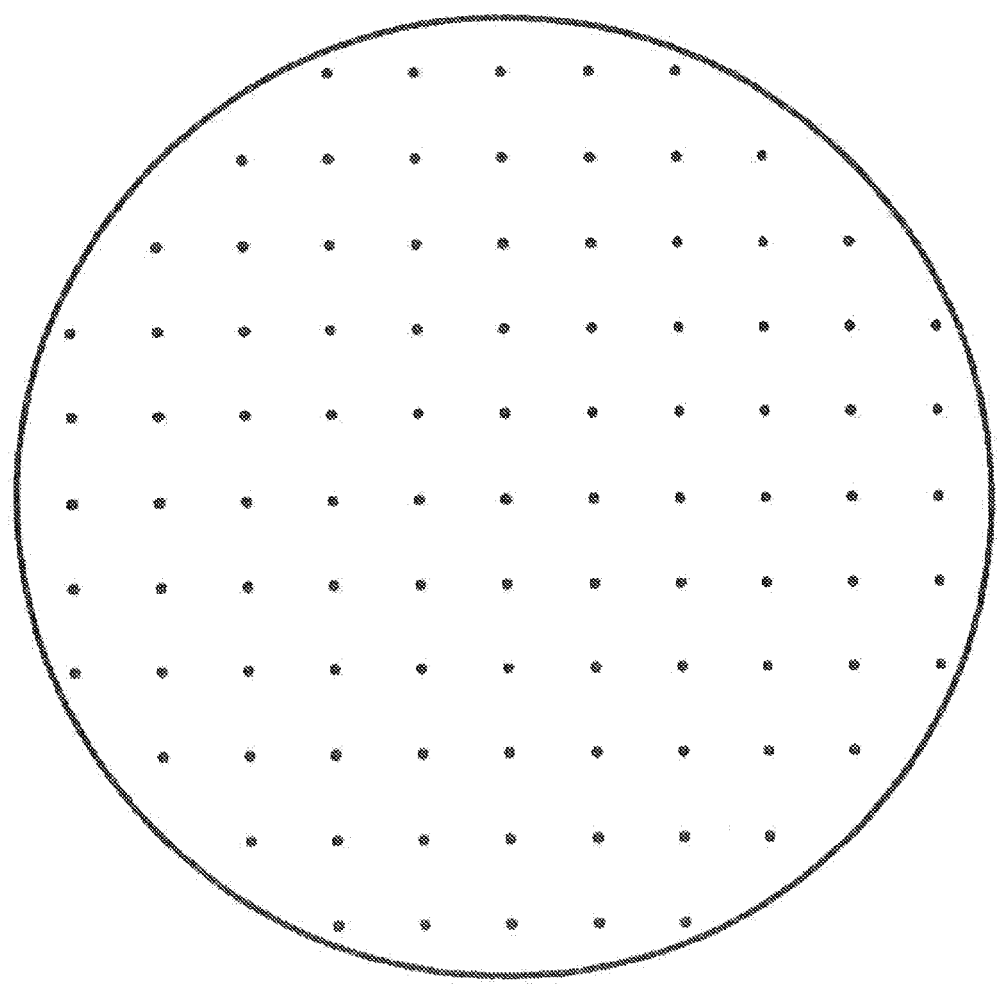
FIG. 2 is a diagram showing an example of the distribution of coordinates of evaluation points.

FIG. 2 is a diagram showing an example of the distribution of coordinates of evaluation points. At the evaluation points shown in FIG. 2, the reference optical performance values and the target optical performance values are determined.

Figure 3:
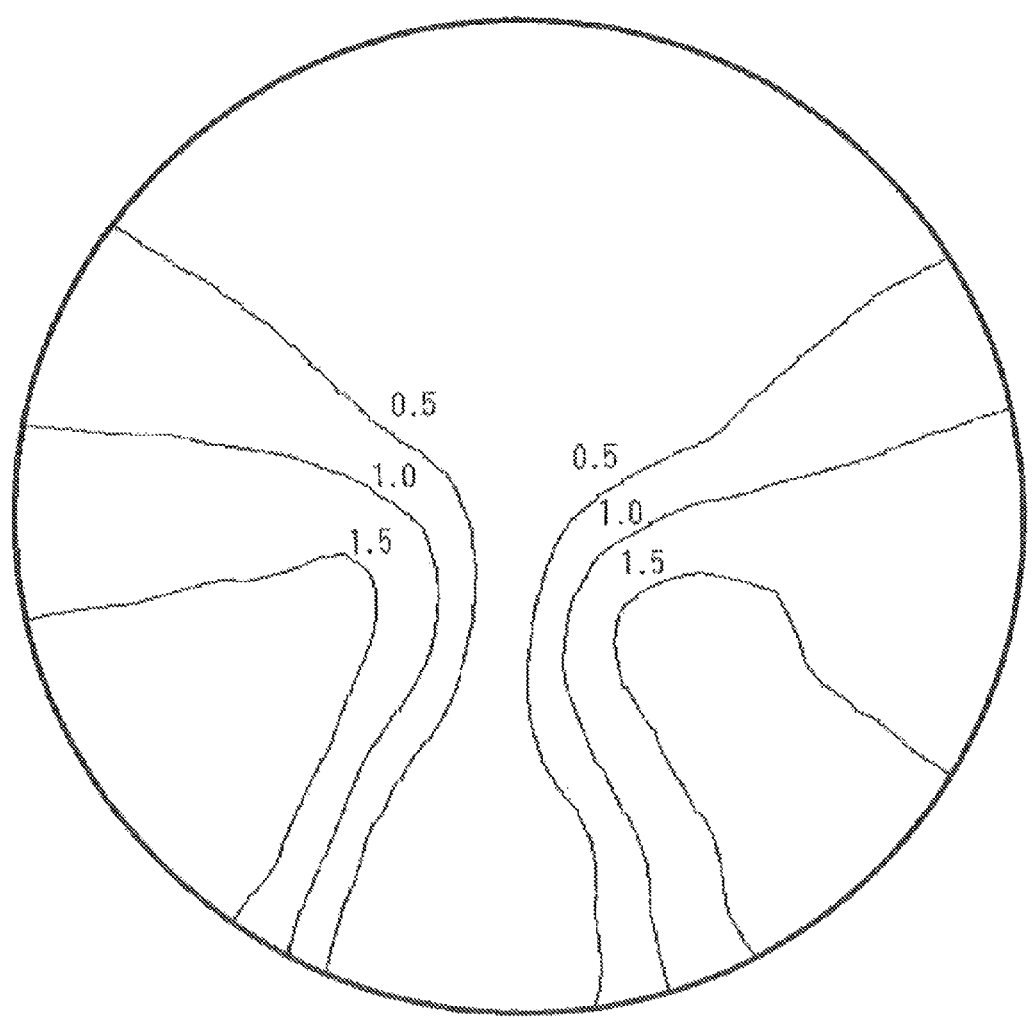
FIG. 3 is a diagram showing an example of reference optical performance.

FIG. 3 is a diagram showing an example of reference optical performance. In the example shown in FIG. 3, the distribution of astigmatism is indicated with contour lines. In the example shown in FIG. 3, the progressive power lens has a distribution of astigmatism such that the astigmatism is small in the distance zone provided on the upper part of the lens, the near zone provided on the lower part of the lens, and the intermediate zone that connects the distance zone with the near zone. In the optimization design, the target optical performance values are used while the reference optical performance values are used in the evaluation of the finally designed spectacle lens. Consequently, to ensure consistency between the optimization design and final evaluation, it is effective to use the same coordinates as the coordinates of the above-mentioned evaluation in the evaluation of the reference optical performance and in the evaluation of the target optical performance. However, the reference optical performance value and the target optical performance value in the optimization design need not be identical to each other. The target optical performance value set as the optimization condition may assume various values.

In this embodiment, the storage device 23 includes an optimization condition database that records a plurality of prescription conditions and a plurality of optimization conditions corresponding to the respective prescription conditions. FIG. 4 is a diagram illustrating an example of the configuration of data recorded in the optimization condition database. As shown in FIG. 4, at the optimization condition database, the optimization conditions are recorded (stored) correlated with the respective prescription conditions. FIG. 4 shows an example, in which the recorded prescription conditions include prescription power, astigmatic power, axis of astigmatism, addition, base curve, and center thickness and the recorded optimization conditions include damping factor, xy coordinates of evaluation points, target optical performance values (target values) of respective evaluation points, and weight values of the respective evaluation points.

The optimization condition database is prepared, for instance, within a development period of the spectacle lens product. Within the limited development period, it is difficult to determine most favorable optimization conditions for individual prescription conditions. To cope with this, individual prescription conditions are classified into a plurality of groups, each including prescription conditions having optical characteristics close to each other. For each of such groups, an optimization condition that is common to the members of the group is determined and recorded at the optimization condition database. In the design method described later, initially the same optimization condition may be recorded for all the prescription conditions at the optimization condition database and the optimization conditions at the optimization condition database are updated after the acceptance of an order for products starts.

Figure 5:
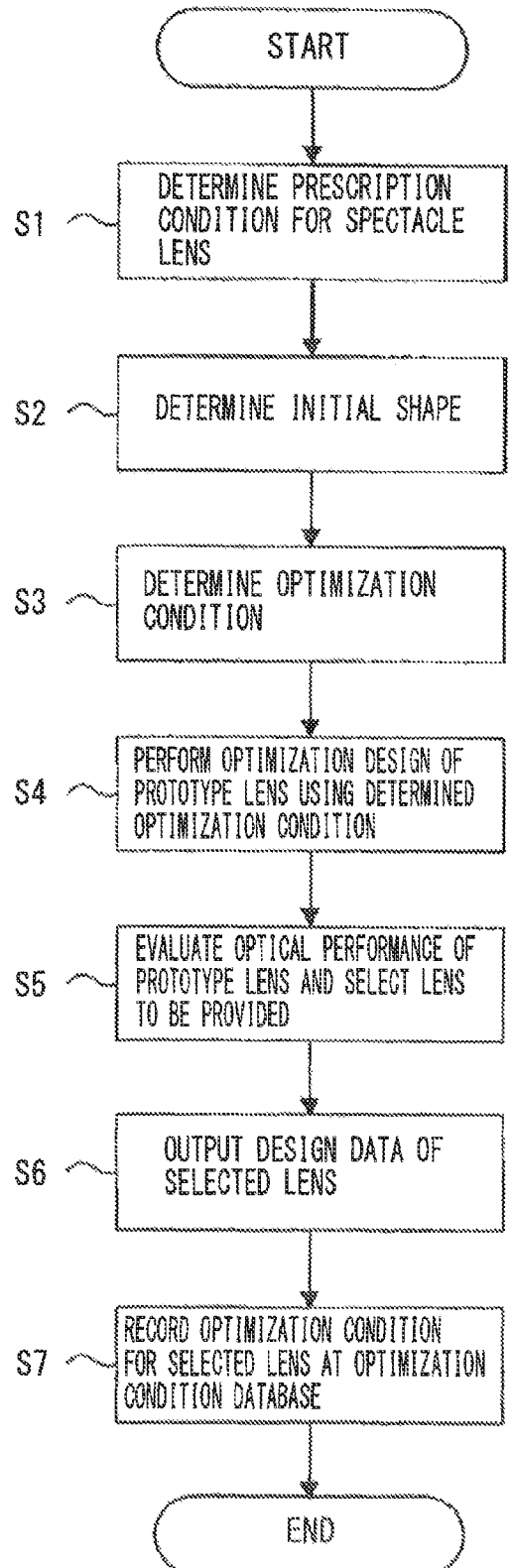
FIG. 5 is a flowchart illustrating a procedure of a method for designing a spectacle lens.

FIG. 5 is a flowchart illustrating a procedure of a method for designing a spectacle lens. This procedure is performed after the spectacle lens has been commercialized and acceptance of orders has started. In step S1, an orderer determines the prescription condition for a spectacle lens to be ordered (hereafter, referred to "designated prescription condition") and the determined prescription condition is then input into the order device 10 via an input device, which is not shown in the figures. Among the prescription conditions, for instance, prescription power, astigmatic power, axis of astigmatism, addition, and pupillary distance are determined by ocular examination or the like of the wearer. The base curve and center thickness and the like are determined based on the result of the ocular examination taking into consideration the appearance of the lens and readiness of processing it. The order device 10 transmits the data of the designated prescription condition input by the orderer to the design device 20 via the communication line 40.

In step S2, the design device 20 determines an initial shape of the spectacle lens according to the designated prescription condition transmitted from the order device 10. For instance, data of initial shape for each prescription conditions is stored in advance in the storage device 23 and the design device 20 acquires the data of initial shape corresponding to the designated prescription condition from the storage device 23 to determine the initial shape.

In step S3, the design device 20 determines the optimization condition used in the optimization design of the spectacle lens. In this case, the design device 20 searches and extracts optimization condition correlated with the designated prescription condition from the optimization condition database and determines the extracted data as the optimization condition for use in optimization design. The designer designates at least one of any optimization conditions that are different from the optimization condition acquired from the optimization condition database and inputs the at least one such optimization condition into the design device 20 via the input device 22. The design device 20 also determines the optimization condition input from the input device 22 to be an optimization condition for use in the optimization design. That is, in this case, the optimization condition acquired from the optimization condition database and the optimization condition freely designated by the designer are determined to be optimization conditions for use in the optimization design.

In step S4, the design device 20 performs optimization design for each optimization condition determined in step S3 to create the design data for a prototype lens (i.e., selection target lens). As a result, prototype lenses, the number of which corresponds to the number of optimization conditions determined in step S3, are designed. (That is, the design device 20 designs the respective selection target lenses using the optimization condition acquired from the optimization condition database and the optimization condition or conditions determined so as to differ from the optimization condition acquired from the optimization condition database.)

In step S5, the design device 20 evaluates the optical performance of the prototype lenses designed in step S4 and selects a spectacle lens to be provided to the orderer based on the results of the evaluation. The evaluation of the optical performance in this step is performed using, for instance, mean square deviation (hereafter, referred to as "evaluation value") between the optical performance of the prototype lens and reference optical performance (that is, the reference specification). (That is, the design device 20 calculates a degree of similarity between the optical performance of the selection target lens and the reference optical performance as an evaluation result.) At least one of astigmatism, average spherical power, and distortion is evaluated as the optical performance. The evaluation value (mean square deviation) can be calculated from, for instance, all the differences between the reference optical performance values at the evaluation points as shown in FIG. 2 and the optical performance values of the prototype lens. The design device 20 selects a prototype lens that has optical performance with the smallest evaluation value (that is, that has the closest similarity to the reference optical performance, in other words, that is most similar to the reference optical performance) as a prototype lens to be provided to the orderer (that is, a spectacle lens corresponding to the designated prescription condition).

Figure 6:
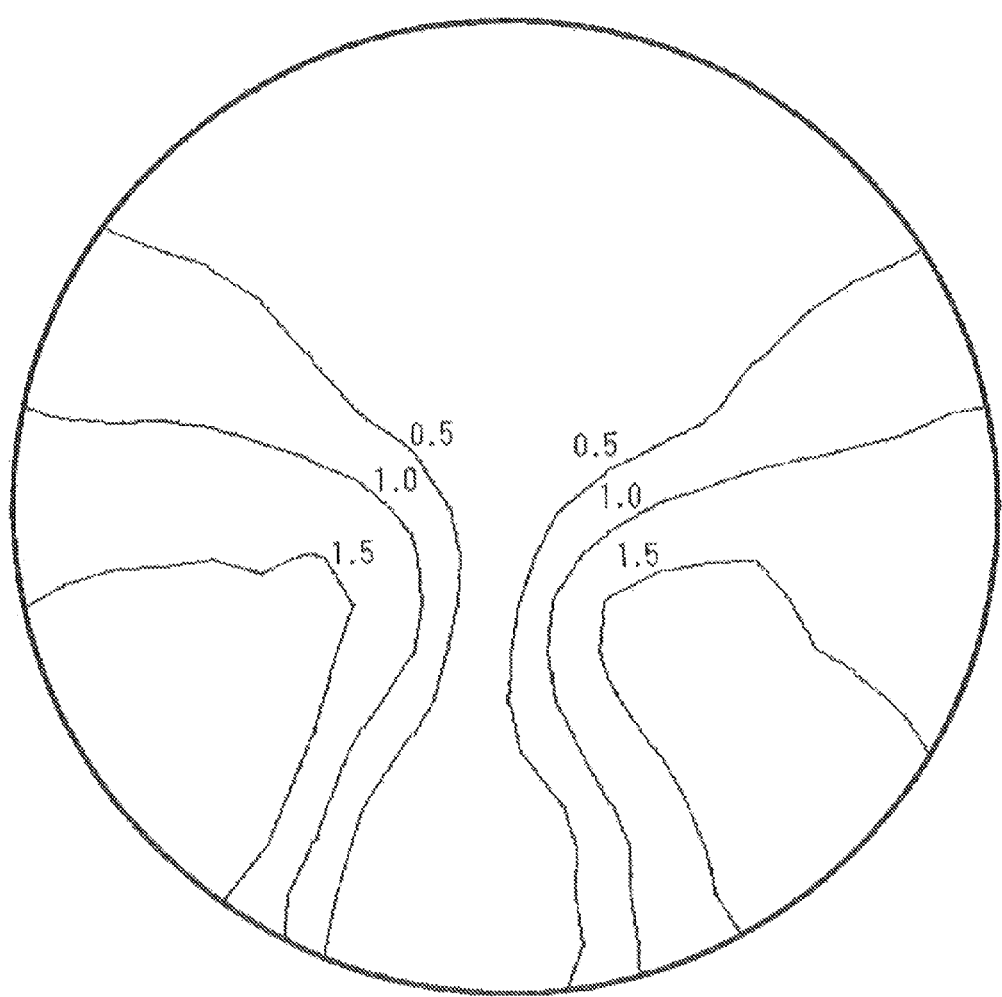
FIG. 6 is a diagram illustrating an example of the optical performance of a prototype lens resulted from optimization design.
Figure 7:
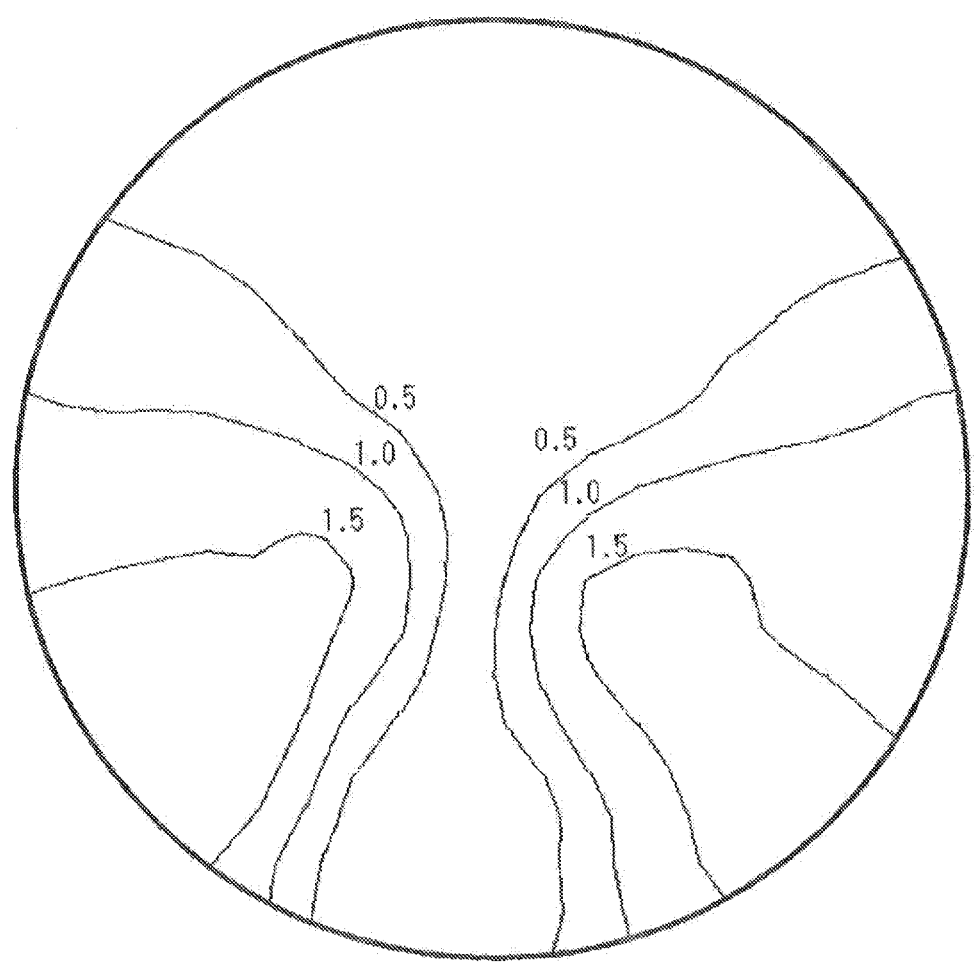
FIG. 7 is a diagram illustrating an example of the optical performance of a prototype lens according to the same prescription condition as the prescription condition shown in FIG. 6 but resulted from optimization design under a different optimization condition than the optimization condition shown in FIG. 6.

FIG. 6 and FIG. 7 show examples of optical performance of prototype lenses that are under the common prescription conditions and resulted from optimization design under different optimization conditions. In FIG. 6 and in FIG. 7, the distribution of astigmatism expressed with contour lines is shown as the optical performance. In FIG. 6 and FIG. 7, the common prescription conditions include a prescription power of −2.00 D, an astigmatic power of −1.00 D, an axis of astigmatism of 90 degrees, an addition of 2.00 D, a base curve of 2.00 D, and a center thickness of 1.1 mm.

The optical performance of the prototype lenses as shown in FIG. 6 has a distribution of astigmatism that is as a whole in compliance with the reference optical performance although that has a broader region having 1.5 D or more on each side of the near zone as compared with the reference optical performance as shown in FIG. 2. The prototype lens as shown in FIG. 6 has an evaluation value for astigmatism of 0.048.

The optimization condition in FIG. 7 has a weight value for the target optical performance value at the evaluation point coordinates near the lens center, which weight value is somewhat larger than the weight value for such a target optical performance value of the optimization condition in FIG. 6. The optical performance of the prototype lens as shown in FIG. 7 has a region of astigmatism of 1.5 that is somewhat narrower than such a region of the prototype lens as shown in FIG. 6 and thus is closer to the distribution of astigmatism of the reference optical performance than the optical performance of the prototype as shown in FIG. 6. The evaluation value of the prototype lens as shown in FIG. 7 is 0.024, which is smaller than the evaluation value of 0.048 of the prototype lens as shown in FIG. 6. In the examples shown in FIG. 6 and FIG. 7, the prototype lens as shown in FIG. 7 has optical performance closer to the reference optical performance than the prototype lens shown in FIG. 6 is and in step S5 the design device 20 selects the prototype lens having the optical performance as shown in FIG. 7 as the spectacle lens to be provided to the orderer.

In step S6, the design device 20 outputs the design data of the prototype lens selected in step S5 to the processing machine control device 30. The processing machine control device 30 sends processing instruction to the spectacle lens processing machine 50 based on the design data output from the design device 20. As a result, a spectacle lens is processed and manufactured by the spectacle lens processing machine 50 based on the design data.

In step S7, the design device 20 updates the optimization condition correlated with the designated prescription condition at the optimization condition database to the optimization condition used in the optimization design of the prototype lens selected in step S5 and record the updated data before the design of the spectacle lens is completed. (That is, the design device 20 stores the optimization condition for the spectacle lens selected in step S5, correlated with the designated prescription condition, at the optimization condition database.) For instance, in the example that the optimization condition in FIG. 6 is recorded at the optimization condition database and the optimization condition shown in FIG. 7 is freely determined by the designer, the optimization condition in FIG. 6 recorded at the optimization condition database is updated to the optimization condition shown in FIG. 7 and the optimization condition shown in FIG. 7 is recorded.

In this manner, in the design system 1, when each order for a spectacle lens is accepted, the optimization condition correlated with the designated prescription condition is acquired from the optimization condition database and using the acquired optimization condition, a prototype lens is optimization designed. Then the optical performance of the thus optimization designed prototype lens and the optical performance of a prototype lens optimization designed based on the optimization condition newly input by the designer are compared with each other. Then, based on the result of the comparison, the prototype lens produced using the optimization condition closer to the reference optical performance is provided to the orderer and the optimization condition closer to the reference optical performance is recorded at the optimization condition database. Thus, at the optimization condition database, every time when optimization design is performed, the optimization condition is updated to one that enables optimization design of a spectacle lens that has optical performance closer to the reference optical performance than ever for each individual prescription condition. This enables the optical performance of the designed spectacle lens to be approximated to the reference optical performance for each individual prescription condition gradually, e.g., day after day. Consequently, fluctuation of optical performance due to prescription conditions can be reduced gradually, e.g., day after day.

If no designated prescription condition is recorded at the optimization condition database, in step S3, an optimization condition correlated with a prescription condition having an optical characteristic close to the designated prescription condition may be acquired from the optimization condition database and determined as an optimization condition used in the optimization design. Alternatively, only the optimization condition designated by the designer may be determined as the optimization condition to be used in the optimization design. In this case, in step S7, the design device 20 additionally records the optimization condition used in the optimization design of the prototype lens selected in step S5 correlated with the designated prescription condition at the optimization condition database. As mentioned above, the design system 1 is capable of additionally recording an optimization condition for any prescription condition that is not recorded at the optimization condition database. This enables the design system 1 to cope with new prescription condition.

According to the first embodiment explained above, the following operations and advantageous effects can be obtained.

(1) The method for designing a spectacle lens according to the first embodiment includes: a determination step of determining optimization conditions used in optimization design of a spectacle lens in accordance with a designated prescription condition; a design step of designing a prototype lens by optimization design for each of the optimization conditions determined in the determination step; a selection step of selecting a prototype lens to be provided as a spectacle lens from the prototype lenses designed in the design step; and a recording step of updating, at an optimization condition database that stores a plurality of prescription conditions, respectively, correlated with a plurality of optimization conditions, an optimization condition correlated with a designated prescription condition with the optimization condition used in the optimization design of the prototype lens selected in the selection step. This enables the optimization condition recorded at the optimization condition database to be updated to be approximated to the optimization condition suitable for the individual prescription condition, so that optimization design of spectacle lenses using the optimization conditions suitable for the individual prescription conditions can be achieved.

(2) In the method for designing a spectacle lens according to (1) above, the recording step is configured such that if no optimization condition corresponding to the designated prescription condition is recorded at the optimization condition database, the optimization condition used in the optimization design of the prototype lens selected in the selection step is additionally recorded, correlated with the designated prescription condition, at the optimization condition database. This enables newly recording an optimization condition for a prescription condition that is not recorded at the optimization condition database to allow optimization design of spectacle lenses using appropriate optimization conditions for all the prescription conditions.

Second Embodiment

Now, a second embodiment of the present invention is explained. The method for designing a spectacle lens according to the second embodiment differs from the first embodiment in that in the second embodiment, in addition to the optimization condition having the smallest evaluation value (i.e., closest to the reference optical performance), history information about the optimization conditions of which optimization design and evaluation of optical performance were performed are recorded. Explanation is focused on this point.

Figure 8:
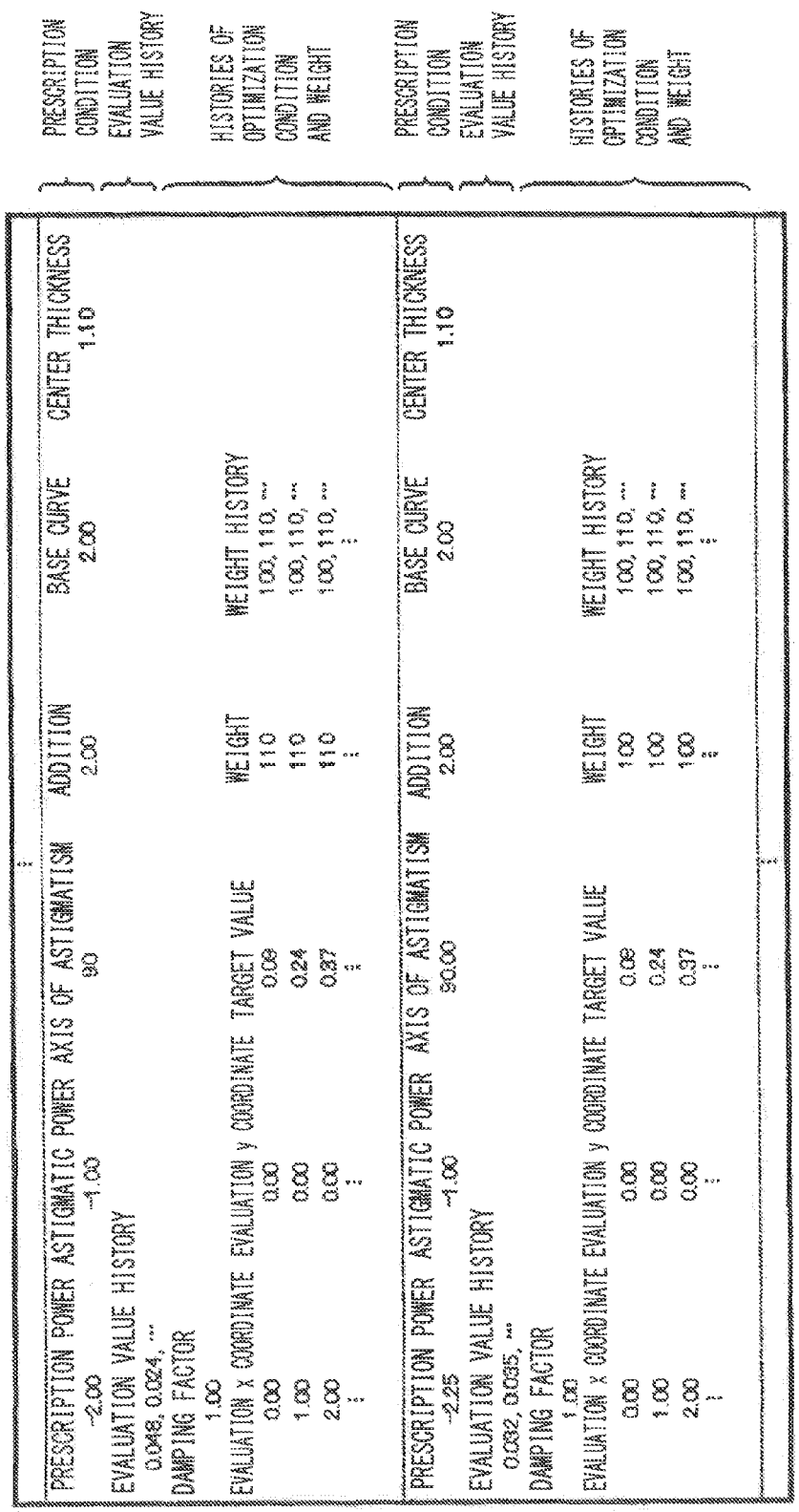
FIG. 8 is a diagram illustrating an example of the configuration of data recorded in an optimization condition database according to a second embodiment.

FIG. 8 is a diagram illustrating an example of the configuration of data recorded in an optimization condition database according to the second embodiment. FIG. 8 shows a case in which optimization design is performed a plurality of times with changing weight, which is one of the optimization conditions. At the optimization condition database, the history of respective weights used in the optimization design is recorded, correlated with the prescription conditions. The history of each evaluation value is recorded, correlated with the history of each weight.

In the method for designing a spectacle lens according to the second embodiment, first the prescription condition and the initial shape of a spectacle lens are determined in the same manner as that in the first embodiment (step S1 and S2). Then, upon determination of the optimization condition in step S3, the design device 20 acquires the history information about optimization conditions and the evaluation values correlated with the designated prescription condition from the optimization condition database and brings them on display at the display device 21. This enables the designer to use the optimization conditions and the history information about the evaluation value as effective indices upon designating the optimization condition. For instance, the designer can designate a new optimization condition with avoiding overlap with the optimization condition under which optimization design has been already performed. The design device 20 determines the optimization condition acquired from the optimization condition database and the optimization condition input from the input device 22 as optimization conditions used in the optimization design in step S4 in the same manner as that in the first embodiment.

Thereafter, the design device 20, in the same manner as that in the first embodiment described above, performs the optimization design of the prototype lens (step S4), evaluation of the optical performance of the prototype lenses and selection of the prototype lens to be provided (step S5), and output of the design data of the selected prototype lens (step S6).

In step S7, the design device 20, in the same manner as that in the first embodiment, updates the record of the optimization condition with the optimization condition used in the optimization design of the prototype lens selected in step S5 at the optimization condition database. Along with this, the design device 20 records all the optimization conditions determined in step S3 and the evaluation value of each of the optimization conditions at the optimization condition database as history information about optimization conditions and the evaluation values, correlated with the designated prescription condition.

The history information about the optimization conditions and the evaluation values may be stored in a region other than the region in which information about the optimization condition having the smallest evaluation value (i.e., closest to the reference optical performance) is stored. However, it will facilitate search of optimization conditions for each prescription condition by storing the history information about the optimization conditions and the evaluation values together at the optimization condition database as in this embodiment.

In the method for designing a spectacle lens according to the second embodiment mentioned above, all the optimization conditions determined in step S3 and respective evaluation values corresponding to the optimization conditions, correlated with the designated prescription condition, are recorded (stored) at the optimization condition database. In addition, upon determination of the optimization conditions in step S3, history information about the optimization conditions and the evaluation values recorded, correlated with the designated prescription condition at the optimization condition database, are brought up on display at the display device 21. This enables the designer to use the displayed history information about the optimization conditions and the evaluation values as effective indices upon designation of the optimization conditions.

Third Embodiment

Next, a third embodiment of the present invention is explained. The method for designing a spectacle lens according to the third embodiment differs from the methods according to the first and second embodiments, in which the designer inputs any optimization condition into the design device 20 in step S3 above, in that the design device 20 automatically determines an optimization condition according to the list (hereafter, referred to as "prototype optimization condition list") stored in advance at the storage device 23 in step S3.

FIG. 9 is a diagram showing an example of a prototype optimization condition list according to the third embodiment. In the prototype optimization condition list, at least one optimization condition for optimization design of a prototype lens in step S4 is registered. Each optimization condition is given an identification number (in FIG. 9, these being indicated as optimization condition (1), optimization condition (2), . . . ).

In step S3 above, design device 20 acquires a prescribed number of optimization conditions in order of their identification numbers, for instance, from the prototype optimization condition list and determines the acquired optimization conditions as optimization conditions for use in the optimization design. The acquisition method for acquiring optimization conditions from the prototype optimization condition list is not limited to this method. Any method that allows selection may be used to acquire the at least one optimization condition.

Figure 10:
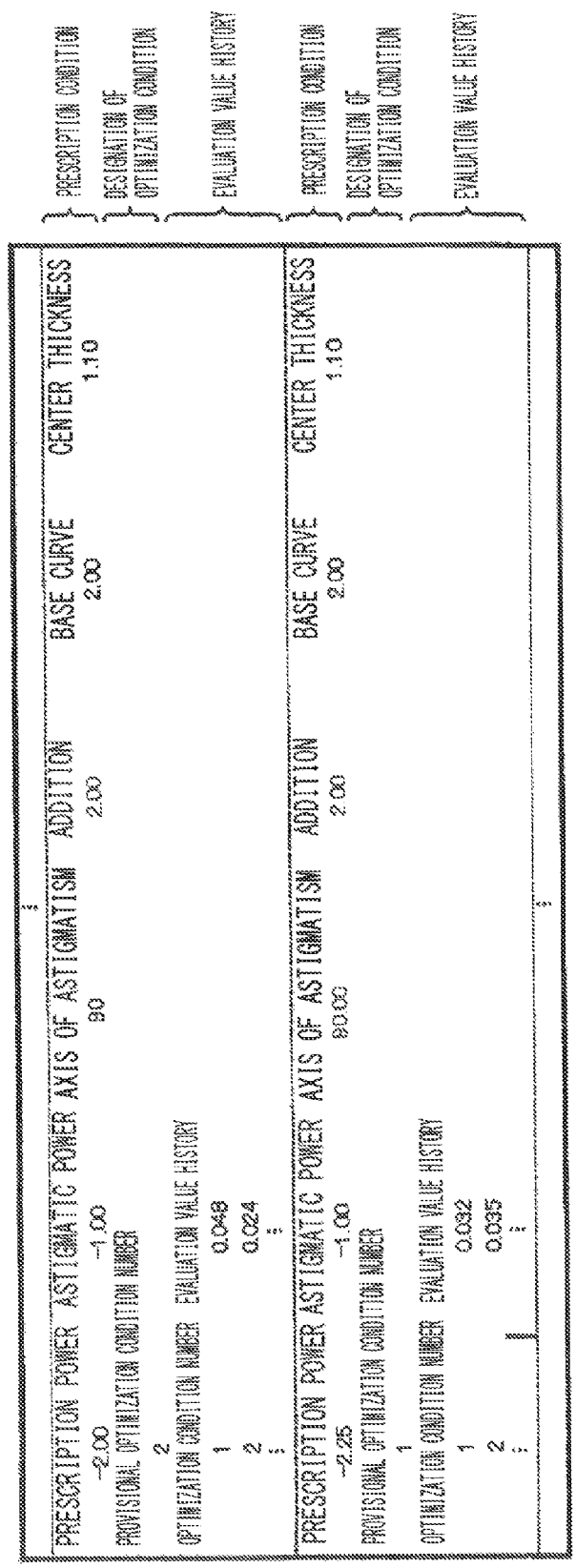
FIG. 10 is a diagram illustrating an example of the configuration of data recorded in an optimization condition database according to the third embodiment.

FIG. 10 is a diagram illustrating an example of the configuration of data recorded in an optimization condition database according to the third embodiment. As shown in FIG. 10, the optimization condition database according to this embodiment records provisional optimization conditions and histories of evaluation values correlated with the respective prescription conditions. The provisional optimization condition is an optimization condition that has the smallest evaluation value (that is closest to the reference optical performance), the record of which is updated in step S7. As the provisional optimization condition, the identification number of the optimization condition is recorded. The history of the evaluation value is recorded, correlated with the identification number of the optimization condition (optimization condition number).

Reference to such an optimization condition database enables determination as to how many optimization conditions for each prescription condition are used for optimization design and whether further improvement of evaluation value is possible and so on. For instance, upon determination of the optimization condition in step S3, the design device 20 refers to the optimization condition database to acquire the optimization conditions recorded as the provisional optimization conditions and optimization conditions that remain to be used in optimization design from the prototype optimization condition list and may determine the acquired optimization conditions as optimization conditions for use in optimization design. This enables updating the optimization conditions recorded at the optimization condition database to approximate the optimization conditions to optimization conditions suitable for individual prescription conditions with eliminating redundant use of the optimization conditions previously used in the optimization design.

In the method for designing a spectacle lens according to the third embodiment explained above, the design device 20 determines the optimization conditions used in the optimization design in step S4 according to the prototype optimization condition list stored in advance at the storage device 23. This enables the design device 20 to automatically determine the optimization condition.

Fourth Embodiment

Next, a fourth embodiment of the present invention is explained below. The method for designing a spectacle lens according to the fourth embodiment of the present invention differs from the methods according to the first to the third embodiments in that in step S3 described above, the design device 20 determines the optimization conditions by automatic calculation according to, for instance, a mathematical formula or formulas based on history information about the optimization conditions and the evaluation values.

In this embodiment, in the same manner as that in the second embodiment, the history of the optimization conditions used in the optimization design in past times and the history of the evaluation values corresponding to such optimization conditions are recorded at the optimization condition database. To achieve automatic calculation of optimization conditions, optimization conditions used in past optimization design for at least twice, i.e., last time and last time but one and evaluation values of prototype lenses that are optimization designed based on such optimization conditions need be already recorded at the optimization condition database. The design device 20 determines a linear function or a non-linear function that approximates a plurality of evaluation values recorded as the history information at the optimization condition database and using the determined function, the design device 20 calculates or estimates an optimization condition that gives an improved evaluation value from the optimization conditions recorded as the history information using this approximated function.

For instance, assuming that history information is recorded in which changing the weight as the optimization condition from 100 to 110 results in a change in an evaluation value from 0.04 to 0.03, the weight next time may be set at 120 with expectation of obtaining an evaluation value of 0.02 or at 140 with an expectation of obtaining an evaluation value of 0.00. In addition, assuming that history information is recorded in which weights of 100, 110, and 120, respectively, result in evaluation values of 0.04, 0.03, and 0.05, polynominal approximation may be made regarding the relationship between the weight and the evaluation value and the weight may be set at an appropriate value between 100 and 110 with an expectation of obtaining a minimal value of the evaluation value.

This method, which may depend on the approximation method and coefficients used for the determination of optimization conditions, enables more efficient determination of optimization conditions as more evaluation values are recorded as the history information at the optimization condition database. However, depending on the storage capacity of the storage device 23, it may be difficult to record the histories of optimization conditions used in optimization design and evaluation values for all the prescription conditions at the optimization condition database. To cope with this, for instance, the number of evaluation values recorded may be adjusted for each prescription condition depending on a deviation in distribution of prescriptions, since the deviation occurs commonly in the distribution of prescribed optical performance in the products actually provided.

In the method for designing a spectacle lens according to the fourth embodiment, the design device 20 determines the optimization condition used in the optimization design in step S4 based on the history information about the optimization condition and the evaluation value stored correlated with the prescription condition. This configuration enables the design device 20 to automatically determine the optimization conditions.

Variation Examples

In the above-mentioned embodiments, optimization design of a prototype lens using more optimization conditions enables optimization conditions corresponding to more excellent optical performance to be recorded at the optimization condition database. This increases time necessary for optimization design of the prototype lens by a factor of the number of the optimization conditions used. In recent years, for instance, improvement in calculation speed of computers, developments of multiple central processing units (CPUs) or of multi-core CPU provides an environment for performing a plurality of calculations at high speeds simultaneously. Consequently, from estimation of an award volume of a product or the like, no updating of the optimization condition database is performed in busy seasons whereas in off-seasons, prototype lenses are optimization designed using many optimization conditions and updating processing of the optimization condition database is performed to control the number of processing per unit time in compliance with the performance of the computer.

In the above-mentioned embodiment, the examples are explained in which the optical performance of a prototype lens is evaluated. However, the shape of the prototype lens (for instance, base curve, center thickness, edge thickness, etc.) may be evaluated. Both the optical performance and the shape of the prototype lens may be evaluated.

In the above-mentioned first and second embodiments, the examples are explained in which in step S3 the optimization condition acquired from the optimization condition database and any optimization condition that is input by the designer are determined as the optimization conditions to be used in the optimization design of a prototype lens. However, the present invention is not limited to these examples and it is sufficient to determine at least one optimization condition for use in the optimization design of a prototype lens.

In the above-mentioned embodiments, the examples are explained in which a progressive power spectacle lens is designed. However, the present invention is not limited to this example and a monofocal or a multifocal spectacle lens may be designed by using the design method for the present invention.

In the above-mentioned embodiments, the design device 20 updates, at the optimization condition database, the record of the optimization condition correlated with the designated prescription condition with the optimization condition used in the optimization design of a prototype lens selected in step S5. In this case, the design device 20 may be configured to update the record of the optimization condition for the spectacle lens selected in step S5 if the optimization condition for the spectacle lens selected in step S5 differs from the optimization condition corresponding to the designated prescription condition stored at the optimization condition database. On the other hand, if the optimization condition for the spectacle lens selected in step S5 is the same as the optimization condition corresponding to the designated prescription condition stored at the optimization condition database, the design device 20 may be configured to maintain the state or condition in which the optimization condition is stored at the optimization condition database.

The embodiments explained above may be rephrased as follows. According to an eleventh aspect of the present invention, a system for designing a spectacle lens includes: an acquisition unit that acquires, from a database storing design conditions for a spectacle lens respectively correlated with prescription conditions for the spectacle lens, a design condition corresponding to a predetermined prescription condition; a determination unit that determines at least one design condition differing from the design condition acquired by the acquisition unit; a design unit that designs a selection target lens using the design condition acquired by the acquisition unit and a selection target lens using the design condition determined by the determination unit; a selection unit that calculates by simulation at least one of optical performance and shape of each of the selection target lenses designed by the design unit and selects a selection target lens that has closest similarity to a prescribed reference specification as a spectacle lens corresponding to the predetermined prescription condition; and a storage control unit that stores the design condition for the spectacle lens selected by the selection unit correlated with the prescription condition for the spectacle lens at the database.

According to a twelfth aspect of the present invention, it is preferred that in the system for designing a spectacle lens of the eleventh aspect, the selection unit calculates a degree of similarity of the optical performance or of the shape calculated by the simulation to the prescribed reference specification as an evaluation result and the storage control unit stores the design conditions determined by the determination unit and the respective evaluation results as history information about the design condition and the evaluation result, correlated with the prescription condition for the spectacle lens at the database.

According to a thirteenth aspect of the present invention, it is preferred that in the system for designing a spectacle lens of the twelfth aspect, the determination unit calculates a design condition that provides an improved evaluation result based on the history information and determines the design condition to be used at the design unit.

According to a fourteenth aspect of the present invention, it is preferred that in the system for designing a spectacle lens of the thirteenth aspect, the determination unit approximates a plurality of evaluation results recorded as the history information to a linear function or a non-linear function and calculates a design condition that provides an improved evaluation result using the linear function or the non-linear function.

According to a fifteenth aspect of the present invention, it is preferred that in the system for designing a spectacle lens of any one of the twelfth to fourteenth aspects, the evaluation result is a difference or mean square deviation between the optical performance calculated by the simulation and the predetermined reference optical performance.

According to a sixteenth aspect of the present invention, it is preferred that in the system for designing a spectacle lens of any one of the eleventh to fifteenth aspects, the optical performance is at least one of astigmatism, average spherical power, and distortion.

According to a seventeenth aspect of the present invention, it is preferred that in the system for designing a spectacle lens of any one of eleventh to sixteenth aspects, the storage control unit causes updating and recording to be performed if the design condition for the spectacle lens corresponding to the predetermined prescription condition selected by the selection unit differs from the design condition corresponding to the predetermined prescription condition stored at the database.

According to an eighteenth aspect of the present invention, it is preferred that in the system for designing a spectacle lens of any one of eleventh to sixteenth aspects, the storage control unit causes the stored state or condition to be maintained if the design condition for the spectacle lens corresponding to the predetermined prescription condition selected by the selection unit is the same as the design condition corresponding to the prescription condition stored at the database.

According to a nineteenth aspect of the present invention, it is preferred that in the system for designing a spectacle lens of any one of the eleventh to eighteenth aspects, the determination unit determines the design condition to be used at the design unit according to the design condition that is stored in advance at the storage device.

According to a twentieth aspect of the present invention, the method for designing a spectacle lens includes: an acquisition step of acquiring, from a database that stores design conditions for a spectacle lens respectively correlated with prescription conditions for the spectacle lens, a design condition corresponding to a predetermined prescription condition; a determination step of determining at least one design condition that differs from the design condition acquired in the acquisition step; a design step of designing respective selection target lenses using the design condition acquired in the acquisition step and the at least one design condition determined in the determination step; a selection step of calculating by simulation at least one of optical performance and shape of each of the selection target lenses designed in the design step and selecting the selection target lens that has a closest similarity to a prescribed reference condition as a spectacle lens corresponding to the predetermined prescription condition; and a storage step of storing at a database the design condition for the spectacle lens selected in the selection step, correlated with the prescription condition for the spectacle lens.

According to a twenty first aspect of the present invention, the method for manufacturing a spectacle lens includes: a lens design step of designing a spectacle lens by the method for designing a spectacle lens of the twentieth aspect; and a lens processing step of processing a spectacle lens based on the design in the lens design step.

The present invention enables determination of optimization conditions suitable for individual prescription conditions.

The above described embodiments are exemplary and the present invention is not limited to the configurations of the above mentioned embodiments. In addition, the above mentioned embodiments may be combined with the variation examples as appropriate.

What is claimed is:

1. A method for designing a spectacle lens, comprising:
   a determination step of determining at least one optimization condition for which optical performance is evaluated, the at least one optimization condition to be used in optimization design of a spectacle lens correlated with a prescription condition that determines a specification for the spectacle lens;
   a design step of designing at least one prototype lens by the optimization design corresponding to the at least one optimization condition determined in the determination step;
   a selection step of selecting a prototype lens to be provided as the spectacle lens from the at least one prototype lens designed in the design step;
   a manufacturing step of manufacturing the spectacle lens based on design data of the prototype lens selected by the selection step;
   a storing step of storing in a database a plurality of optimization conditions respectively correlated with a plurality of prescription conditions; and a recording step of updating, at the database, the at least one optimization condition that is correlated with the prescription condition for the spectacle lens to being in the database as at least one optimization condition used in the optimization design of the prototype lens selected in the selection step.

2. The method for designing a spectacle lens according to claim 1, wherein in the determination step, the at least one optimization condition correlated with the prescription condition for the spectacle lens is acquired from the database and is determined as the at least one optimization condition to be used in the design step.

3. The method for designing a spectacle lens according to claim 1, wherein
   in the selection step, at least one of optical performance and a shape of the prototype lens is evaluated and based on an evaluation result a prototype lens to be provided as the spectacle lens is selected from the prototype lens.

4. The method for designing a spectacle lens according to claim 3, wherein
   optical performance is evaluated in the selection step, the optical performance is at least one of astigmatism, average spherical power, and distortion.

5. The method for designing a spectacle lens according to claim 1, wherein
   in the recording step, the at least one optimization condition used in the optimization design of the prototype lens selected in the selection step is additionally recorded at the database and correlated with the prescription condition for the spectacle lens if no optimization condition corresponding to the prescription condition for the spectacle lens was previously recorded at the database.

6. The method for designing a spectacle lens according to claim 3, wherein
   in the recording step, optimization conditions determined in the determination step and respective evaluation results for the optimization conditions in the selection step, correlated with the prescription condition for the spectacle lens, are recorded as history information about the optimization conditions and the evaluation results at the database.

7. The method for designing a spectacle lens according to claim 6, further comprising:
   a display step of displaying at a display device the history information recorded correlated with the prescription condition for the spectacle lens at the database.

8. The method for designing a spectacle lens according to claim 1, wherein
   in the determination step, the optimization condition to be used in the design step is determined according to a list of optimization conditions stored in advance in a storage device.

9. The method for designing a spectacle lens according to claim 6, wherein
   in the determination step, the at least one optimization condition is determined based on history information previously recorded and correlated with the prescription condition for the spectacle lens.

10. A system for designing a spectacle lens, comprising:
a determination unit that determines at least one optimization condition for which optical performance is evaluated, the at least one optimization condition to be used in optimization design of a spectacle lens correlated with a prescription condition that determines a specification for the spectacle lens;
a design unit that designs by the optimization design at least one prototype lens corresponding to the at least one optimization condition determined by the determination unit;
a selection unit that selects a prototype lens to be provided as the spectacle lens from the at least one prototype lens designed by the design unit;
a manufacturing unit that manufactures the spectacle lens based on design data of the prototype lens selected by the selection unit;
a storing unit that stores in a database a plurality of optimization conditions respectively correlated with a plurality of prescription conditions; and a record control unit that updates, at the database, the at least one optimization condition that is correlated with the prescription condition for the spectacle lens to being in the database as at least one optimization condition used in the optimization design of the prototype lens selected by the selection unit.

* * * * *